United States Patent [19]

Schmidt et al.

[11] 4,264,121

[45] Apr. 28, 1981

[54] BINOCULAR TELESCOPE

[75] Inventors: Wilhelm Schmidt, Aalen-Hofen; Karl Grunvogel, Aalen, both of Fed. Rep. of Germany

[73] Assignee: Carl Zeiss-Stiftung, Oberkochen, Fed. Rep. of Germany

[21] Appl. No.: 79,365

[22] Filed: Sep. 27, 1979

[30] Foreign Application Priority Data

Oct. 7, 1978 [DE] Fed. Rep. of Germany ....... 2843877

[51] Int. Cl.³ .......................... G02B 23/18; G02B 7/24
[52] U.S. Cl. ........................................ 350/36; 350/75
[58] Field of Search ............. 350/75, 76, 71, 72, 350/36, 32, 18, 146; D16/58, 59, 62, 63

[56] References Cited

U.S. PATENT DOCUMENTS

| 962,929 | 6/1910 | Straubel | 350/75 |
| 1,022,340 | 4/1912 | Steinle | 350/75 |
| 2,573,560 | 10/1951 | French | 350/75 |

FOREIGN PATENT DOCUMENTS

| 13369 of 1908 | United Kingdom | 350/75 |
| 1427004 3/1976 | United Kingdom | 350/75 |

*Primary Examiner*—Jon W. Henry
*Attorney, Agent, or Firm*—Hopgood, Calimafde, Kalil, Blaustein & Lieberman

[57] ABSTRACT

The invention contemplates a binocular-telescope construction wherein no precision optical alignment or realignment procedures are needed within the telescope tubes, once the telescope tubes are assembled to their connecting bridge structure. The nature of the connecting bridge structure is such as to provide a range of universal action in the connection of each telescope tube to the bridge structure so that optical-axis parallelism can be mechanically effected and clamped at the universal connections without operating upon any of the individual optical elements within the telescope tube. The universal action and clamping is without prejudice to the single-articulated or double-articulated nature and action of the connecting bridge, for inter-pupilary-distance accommodation.

6 Claims, 2 Drawing Figures

BINOCULAR TELESCOPE

BACKGROUND OF THE INVENTION

This invention relates to a binocular telescope having a connecting bridge between the individual telescopes, wherein the bridge contains at least one pivot pin.

In such binocular telescopes the optical axes of the individual telescopes are so adjusted upon manufacture that they lie precisely parallel to each other and precisely parallel to the pivot pin or pins in the connecting bridge. This adjustment has heretofore been effected optically by adjustment of the optical elements of the individual telescopes. This means that the housings of the individual telescopes must be developed in multipartite fashion in order to permit unimpeded access to the optical elements, and that these elements must be arranged in adjustable mounts. Because of this, in addition to the mechanical expense, a minimum size is established for the individual telescope housings, since they must permit displacement of the optical elements during the adjustment. The optical adjustment described is furthermore rather time-consuming.

BRIEF STATEMENT OF THE INVENTION

It is the object of the present invention to create a binocular telescope with individual telescopes of simple, rugged and compact construction, said binocular telescope having between the individual telescopes a connecting bridge which contains at least one pivot pin, and is of such construction as to permit simple and time-saving adjustment for precise parallelism of telescope axes.

In accordance with the invention, this object is achieved by providing additional pivot action in the connecting bridge between the individual telescopes, the additional pivot action enabling each of the individual telescopes to be swung about two axes which are perpendicular to the pivot pin and to each other. The additional pivot action may be provided by two pivots which are preferably developed as ball joints; however, universal joints can also be used.

The new binocular telescope makes it possible to swing the individual telescopes about any required axis for adjustment, i.e., it makes a mechanical adjustment possible rather than the optical adjustment described above. As soon as the correct adjustment has been effected, the housings of the individual telescopes are locked in their adjusted position. By swinging the individual telescopes about the pivot pin (pins), the pupil distance can then be adjusted.

Since optical adjustment is no longer necessary in the case of the new binocular telescope, the housings of the individual telescopes can be developed in a single piece, and the optical elements arranged within them in such manner as to be adjustable only for dioptric adjustment in the axial direction. In this way, a very rugged structure is made possible.

It can be readily seen that with the new binocular telescope the housings can be developed as a single part of minimum volume, since there are no parts or space requirements for calibrating adjustive displacement of the optical elements.

The adjusting process itself is simple to carry out with the new binocular telescope by merely turning the individual telescopes about two axes. In this way, a substantial saving in time is obtained as compared with optical adjustment.

DESCRIPTION OF A PREFERRED EMBODIMENT

Figure 1:
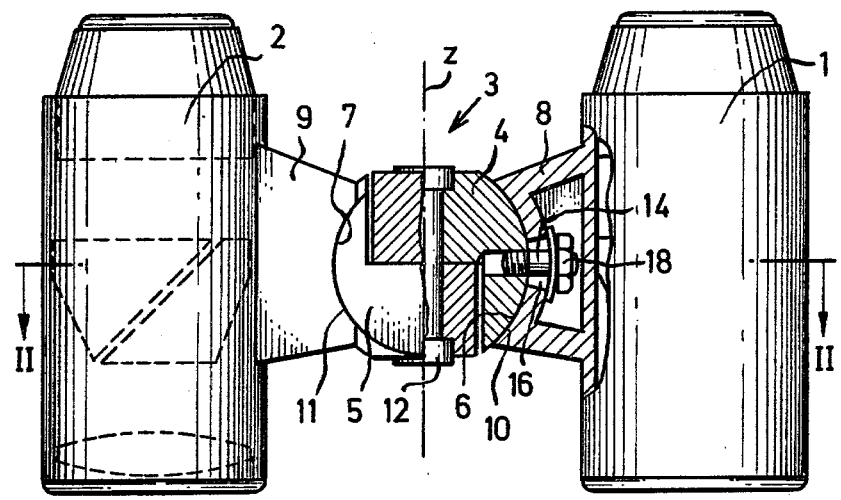
Figure 2:
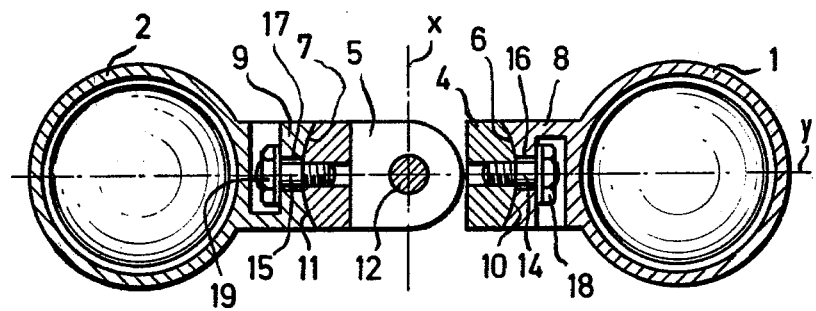

The invention will be described in further detail in connection with the accompanying drawings in which:

FIG. 1 is a front view of an illustrative embodiment of a binocular telescope according to the invention, certain parts being broken-away and in partial section; and FIG. 2 is a sectional view along the line II—II of FIG. 1.

In the accompanying figures, 1 and 2 are the housings of the individual telescopes. Each of these housings is developed as a single part, and the optical elements contained in them, for instance objective, reflecting prism and the ocular guide or support (said optical element being suggested by dashed outlines in telescope 2 of FIG. 1) are fixed in position and are not adjustable.

The individual telescopes 1 and 2 are connected with each other by a connecting bridge 3 consisting of two identical structural parts 4 and 5 which are connected with each other by a pivot pin 12. The structural parts 4 and 5 have convex spherical surfaces 6 and 7. Cooperating with these spherical surfaces, are concave spherical shells 10 and 11 which are formed in arm extensions 8 and 9 of the individual telescopes 1 and 2. In this way, there result two spherical joints 6, 10 and 7, 11.

Each of the parts 4 and 5 carries a stud pin (14 and 15, respectively), which, in the fully spread position of the telescopes 1 and 2, determines the axis designated y in FIG. 2. The individual telescope housings 1 and 2 are swingable about this axis.

The pins 14 and 15 pass through slots 16 and 17 in the bearing shells 10 and 11, and each of these slots extends generally parallel to the pivot pin 12 and parallel to the optical axis of the individual telescopes 1 and 2.

It will be seen that in the described binocular-telescope construction, it is possible to swing the two individual telescope housings 1 and 2 about the x-axis and about the y-axis, thereby mechanically effecting an adjustment in simple fashion.

The two axes x and y are perpendicular to each other and to the z axis, which coincides with the pivot pin 12.

The two pins 14 and 15 are terminated by screw nuts 18 and 19, which are tightened once the proper position of adjustment of the two individual telescope housings 1 and 2 has been reached, thus locking the adjusted position.

Although the illustrative embodiment of FIGS. 1 and 2 incorporates additional joints in the form of ball joints (6, 10 and 7, 11) in the connecting bridge 3, it will be understood that similar action may be provided by universal joints instead of ball joints.

Further, instead of the described single pivot pin 12 in the two-element connecting bridge 3, it will be understood that the described mechanical-adjustment feature may be provided in a three-element connecting bridge, involving double-articulated bridge action via two parallel pivot pins that are spaced by the central one of the three bridge elements, each of the ball-joint connections to be a different telescope arm, being to an outer one of the three bridge elements; such double articulation makes possible a particularly compact packed condition of the binocular telescope.

What is claimed is:

1. A binocular telescope having a connecting bridge between the individual telescopes which contains at least one pivot pin characterized by the fact that in the connecting bridge (3) there are provided in addition two joints (6, 10 and 7, 11) for swinging the individual telescopes (1, 2) around two axes (x, y) which are perpeniduclar to the pivot pin (12) and perpendicular to each other, the ends (6, 7) of the connecting bridge (3) which face the individual telescopes (1, 2) being of spherical development and the housing of each individual telescope including an extension (8, 9) having a bearing shell (10, 11) in the shape of a hollow sphere which cooperates with the associated spherical ends (6, 7) of the connecting bridge (3).

2. A binocular telescope according to claim 1, characterized by the fact that the connecting bridge (3) bears two pins (14, 15) which determine an axis (y) perpendicular to the pivot pin (12) and which pass through slots (16, 17) extending parallel to the optical axes of the individual telescopes (1, 2) in the bearing shells of the housing extensions (8, 9).

3. A binocular telescope according to claim 2, characterized by the fact that said pins have screw elements (18, 19) for locking the set position of adjustment of the individual telescope housings (1, 2).

4. In a binocular telescope in which two spaced individual telescope housings are interconnected to two bridge elements that are pivoted to each other to permit adjustment for interpupilary distance, the improvement in which said bridge elements are identical structural parts which are connected with each other by a pivot pin and which have convex spherical surfaces, each individual telescope housing including an arm extension having a concave spherical shell formation, each of said shell formations coacting with the convex spherical surface of a different one of said two identical structural parts to form a spherical joint enabling rotary adjustment of said individual telescope housings about each of two mutually perpendicular axes which are both perpendicular to the axis of said pivot pin.

5. The improvement of claim 4, in which said telescope housings are identical parts, each integrally formed with its arm extension.

6. The improvement of claim 4, in which each of said identical bridge elements includes an outwardly projecting pin on an axis perpendicular to the pivot-connection axis of said identical bridge elements, each concave spherical shell formation having a pin-guiding slot the alignment of which is in a plane which includes the optical axis of the associated telescope housing.

* * * * *